Patented Dec. 8, 1942

2,304,092

UNITED STATES PATENT OFFICE 2,304,092

REMOVING IRON FROM MAGNESIUM

Graydon E. Holdeman, Midland, Mich., assignor to The Dow Chemical Company, Midland, Mich., a corporation of Michigan No Drawing. Application December 16, 1941, Serial No. 423,182

4 Claims. (Cl. 75—67)

This invention relates to the removal of iron impurities from metallic magnesium.

For some time it has been appreciated that the tendency of uncoated articles of magnesium to corrode on exposure to moist air and to aqueous solutions is in some way dependent upon the presence of traces of iron in the metal. More recently, it has been shown that there is a certain minute but critical proportion of iron, e. g., about 0.017 per cent, below which the metal is highly corrosion-resistant, but above which it is relatively corrodible. It is evident, then, that, in order to render iron-contaminated magnesium resistant to attack, the iron content thereof must be reduced to below the critical corrosion tolerance limit. Unfortunately, however, since at least part of the iron is in actual physical solution in the metal when molten, many of the removal processes described in the art are ineffective in reducing the iron concentration to a sufficiently low value.

It is accordingly an object of the present invention to provide a simple and convenient method of treating iron-contaminated magnesium to reduce the concentration of iron therein to a proportion well below the critical corrision tolerance limit, i. e., to below about 0.017 per cent.

The invention depends upon the discovery that is virtually insoluble, i. e., soluble to an extent far below 0.017 per cent by weight, in molten magnesium containing a small proportion of beryllium. Thus, when beryllium is incorporated into the molten iron-contaminated metal, the dissolved iron is rendered insoluble and precepitates, until less than 0.017 per cent, usually less even than 0.002 per cent, remains in solution. The resulting magnesium, since it contains iron in a proportion below the critical corrosion limit, is highly corrosion-resistant.

In removing dissolved iron impurities from iron-contaminated magnesium according to the invention, then, the metal to be purified is first melted, ordinarily under a protective saline flux. Beryllium is then incorporated into the molten metal in a proportion sufficient to precipitate the iron impurities, as by agitating the melt with finely-divided metallic beryllium. Alternatively and more conveniently, a small proportion of a reducible beryllium compound, suitably anhydrous beryllium chloride, may be stirred into the molten magnesium, the compound being reduced to form metallic beryllium, which becomes incorporated into the melt. Following incorporation of the beryllium, whereby the iron impurities are rendered insoluble and precipitate, the molten metal is separated from the precipitated iron impurities, usually by maintaining the melt quiescent for a time sufficient to allow the insoluble impurities to settle out of suspension, and then decanting or ladling off the supernatant substantially iron-free magnesium.

The initial proportion of baryllium to be incorporated into the molten magnesium to effect precipitation of the iron impurities varies slightly at different temperatures, but is in general at least about 0.008 per cent by weight; a part of this beryllium may settle out of the melt during the iron-settling operation even if no beryllium in excess of this value is originally present. With an initial beryllium concentration in the metal of about 0.008 per cent, the iron impurities settle out of suspension usually within a few hours; higher initial concentrations of beryllium, approaching the maximum which can be incorporated in the molten metal, viz. 0.01 to 0.02 per cent, decrease the iron-settling time to a comparatively short period, often 0.2 to 1.0 hour. In general, the presence of sufficient beryllium is insured by agitating the melt with beryllium added in a substantial excess of the requisite 0.008 per cent, 0.1 to 0.2 per cent by weight beryllium usually being added as beryllium chloride; with such excess, only a small part of the added beryllium actually becomes incorporated into the metal, the remainder of the beryllium being merely in suspension, and settling out of the melt when agitation is discontinued. It is not certain whether the beryllium actually incorporated in the magnesium is in true solution; it may be only included therein in some non-settling form.

The temperature of the molten metal during the beryllium treatment is conveniently well above the melting point. In general, temperatures of about 1600 to 1700° F. permit more rapid iron-settling, although temperatures as low as 1350° F. or even less are operable, at the lower temperatures, the concentration of beryllium remaining in the metal after iron removal is lower than at the higher temperatures.

The following example will illustrate the invention:

Example

Commercially pure magnesium prepared by the electrolysis of magnesium chloride, and containing at least 0.030 per cent of iron impurities, was melted under a protective saline flux and heated to a temperature of 1600° F. Beryllium in a proportion of 0.2 per cent by weight of the alloy was then added with agitation in the form of anhydrous beryllium chloride, the latter being reduced to metallic beryllium, which became incorporated in the magnesium to an extent of 0.016 per cent. The resulting melt was then maintained quiescent for 2 hours, during which time it cooled to 1270° F. and the iron impurities and part of the added beryllium settled out of the melt. The supernatant metal was ladled into iron-free molds and allowed to solidify. On analysis, the metal was found to contain less than 0.001 per cent iron and 0.008 per cent beryllium.

It should be explained that the precise analytical determination of minute proportions of beryllium in magnesium is difficult, and that the numerical values of beryllium concentration set forth above are therefor only the best approximations available. All beryllium concentrations herein reported were determined by painstaking application of standard spectrochemical procedure.

The term "magnesium" as herein employed refers to metallic magnesium of commercial purity, i. e., usually at least 99.5 per cent magnesium, and does not include magnesium-base alloys containing substantial percentages of alloying elements.

The foregoing description is illustrative rather than strictly limitative, the invention being coextensive in scope with the following claims.

I claim:

1. The method of removing dissolved iron impurities from molten iron-contaminated magnesium which comprises incorporating beryllium into the molten metal in a proportion sufficient to precipitate the iron impurities, and separating the precipitated impurities from the molten metal.

2. The method of removing dissolved iron impurities from molten iron-contaminated magnesium which comprises agitating the molten metal with a sufficient quantity of a substance selected from the class consisting of beryllium and reducible beryllium compounds to incorporate therein at least about 0.008 per cent by weight of beryllium, whereby the iron impurities are rendered insoluble and precipitate; and separating the molten metal from the precipitated iron impurities.

3. The method of removing dissolved iron impurities from molten iron-contaminated magnesium which comprises agitating the molten metal with a sufficient quantity of a substance selected from the class consisting of beryllium and reducible beryllium compounds to incorporate therein at least about 0.008 per cent by weight of beryllium, whereby the iron impurities are rendered insoluble and precipitate; discontinuing agitation and maintaining the melt quiescent for a time sufficient to permit the insoluble iron impurities to settle out of suspension; and separating the supernatant iron free metal from the settled impurities.

4. A process according to claim 3 wherein the beryllium is added as substantially anhydrous beryllium chloride.

GRAYDON E. HOLDEMAN.

CERTIFICATE OF CORRECTION.

Patent No. 2,304,092. December 8, 1942.

GRAYDON E. HOLDEMAN.

It is hereby certified that error appears in the printed specification of the above numbered patent requiring correction as follows: Page 1, first column, line 28, after "that" insert the word --iron--; page 1, second column, line 7, for "baryllium" read --beryllium--; and that the said Letters Patent should be read with this correction therein that the same may conform to the record of the case in the Patent Office.

Signed and sealed this 9th day of March, A. D. 1943.

(Seal)

Henry Van Arsdale,
Acting Commissioner of Patents.